United States Patent
Bhartia et al.

(10) Patent No.: US 10,341,908 B1
(45) Date of Patent: Jul. 2, 2019

(54) SEAMLESS ROAMING FOR CLIENTS BETWEEN ACCESS POINTS WITH WPA-2 ENCRYPTION

(71) Applicant: Cisco Technology, Inc., San Jose, CA (US)

(72) Inventors: Apurv Bhartia, San Mateo, CA (US); Lizhen Lin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/909,823

(22) Filed: Mar. 1, 2018

(51) Int. Cl.
| H04W 12/04 | (2009.01) |
| H04W 36/00 | (2009.01) |
| H04W 36/02 | (2009.01) |
| H04W 36/08 | (2009.01) |
| H04W 36/18 | (2009.01) |
| H04W 36/30 | (2009.01) |

(52) U.S. Cl.
CPC ....... *H04W 36/0038* (2013.01); *H04W 12/04* (2013.01); *H04W 36/023* (2013.01); *H04W 36/18* (2013.01); *H04W 36/30* (2013.01); *H04W 36/08* (2013.01)

(58) Field of Classification Search
None
See application file for complete search history.

(56) References Cited

U.S. PATENT DOCUMENTS

| 8,165,091 | B2 * | 4/2012 | Nix | H04L 29/125 370/331 |
| 8,228,861 | B1 * | 7/2012 | Nix | H04W 36/00 370/329 |
| 2009/0010503 | A1 * | 1/2009 | Mathiassen | B60R 25/252 382/125 |
| 2009/0172391 | A1 * | 7/2009 | Kasapidis | H04L 63/061 713/156 |
| 2010/0317420 | A1 * | 12/2010 | Hoffberg | G06Q 30/0207 463/1 |

OTHER PUBLICATIONS

Song et al., "WiFi Goes to Town: Rapid Picocell Switching for Wireless Transit Networks", In Proceedings of SIGCOMM Posters and Demos '17, Los Angeles, CA, USA, Aug. 22-24, 2017, 2 pages.

* cited by examiner

*Primary Examiner* — Kashif Siddiqui
(74) *Attorney, Agent, or Firm* — Hickman Palermo Becker Bingham LLP

(57) ABSTRACT

A wireless network system that provides for seamless roaming of client devices is described. The wireless network system includes a plurality of access points. One access point is designated as the primary access point that is responsible for handling encrypted communication with the client device. The primary access point has access to the necessary encryption key(s) for encrypted communication. The primary access point receives broadcast updates from the other access points that includes connection scores. When a connection score for a second access point exceeds the connection score of the current primary access point, the current primary access point designates the second access point as the new primary access point and sends the new primary access point the encryption key(s) for encrypted communication. The handoff is seamless and does not require a new handshake between the new primary access point and the client device.

20 Claims, 5 Drawing Sheets

SEAMLESS ROAMING FOR CLIENTS BETWEEN ACCESS POINTS WITH WPA-2 ENCRYPTION

TECHNICAL FIELD

The present disclosure relates to wireless access points. More specifically, the disclosure relates to seamless roaming of client devices between wireless access points.

BACKGROUND

In a wireless network that includes a plurality of wireless access points, a client device may roam between those access points.

During the initial connection of the client device to a wireless access point of the wireless network, the client device and the access point must complete a 4-way key management procedure. This handshake process confirms the mutual possession of a Pairwise Master Key (PMK) that they use to generate encryption keys, including a Pairwise Transient Key (PTK). During a 4-way handshake, the access point sends an authenticator nonce value (ANonce) to the client device. The ANonce is pseudo-randomly generated number that is used once. The client device then constructs and installs a Pairwise Transient Key (PTK) using the PMK, the ANonce, a client device nonce value (SNonce), the access point's media access control (MAC) address, and the client device's MAC address. The client device then sends the SNonce and a Message Integrity Code (MIC) generated using the PTK to the access point. The access point then derives and installs the PTK on its end and can validate the MIC that it received. The access point then sends a Group Temporal Key (GTK) and another MIC to the client device. The client device can validate the MIC that it received and install the GTK. Finally, the client device sends an acknowledgement message to the access point. The result of this 4-way handshake is that the client device and the access point have each installed the same PTK and GTK and are ready for encrypted communication between themselves. This 4-way handshake may be used to establish encrypted Wi-Fi Protected Access II (WPA-2) communication between the client device and the access point.

However, as a client device roams through a wireless network that contains a plurality of access points, the same 4-way handshake needs to be performed whenever the client device roams between a first access point and a second access point. The overhead of the 4-way handshake can degrade communication and performance of the wireless network, as the client device needs to repeatedly perform the 4-way handshake as it roams across access points.

Moreover, existing techniques for client roaming between access points require the client device to determine which access point to connect to in the wireless network, and the access points cannot control which access point is going to manage communication with the client device. Thus, if a particular access point is experiencing a significant load, or other performance issues, the wireless network is incapable of forcing the client device to roam to a different access point.

The 802.11v standard attempts to provide access points with improved control over which access point is going to manage communication with the client device. Under 802.11v, an access point may send a Basic Service Set Transition Message (BSS Transition Message) which tells the client device the other access points it can connect to. However, under 802.11v, the client device has control over which specific access point, of the access points identified in the BSS Transition Message, it will connect to next. Thus, the 802.11v does not provide complete control to the access points to determine which access point is going to manage communication with the client device. Moreover, implementation of 802.11v requires installation of new protocol-compliant code or updates on the client device.

The 802.11r Fast Roaming (FT) protocol attempts to provide for improved roaming of client devices, but the protocol requires installation of new protocol-compliant code or updates on client devices. Additional existing techniques for providing seamless roaming between access points requires either a controller-based architecture or requires open service set identifiers (SSIDs) rather than encrypted SSIDs.

Thus, what is needed are techniques for seamless roaming of a client device in between access points with WPA-2 encryption that solves these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) are illustrated by way of example, and not in way by limitation, in the figures of the accompanying drawings and in which like reference numerals refer to similar elements and in which.

Figure 1:
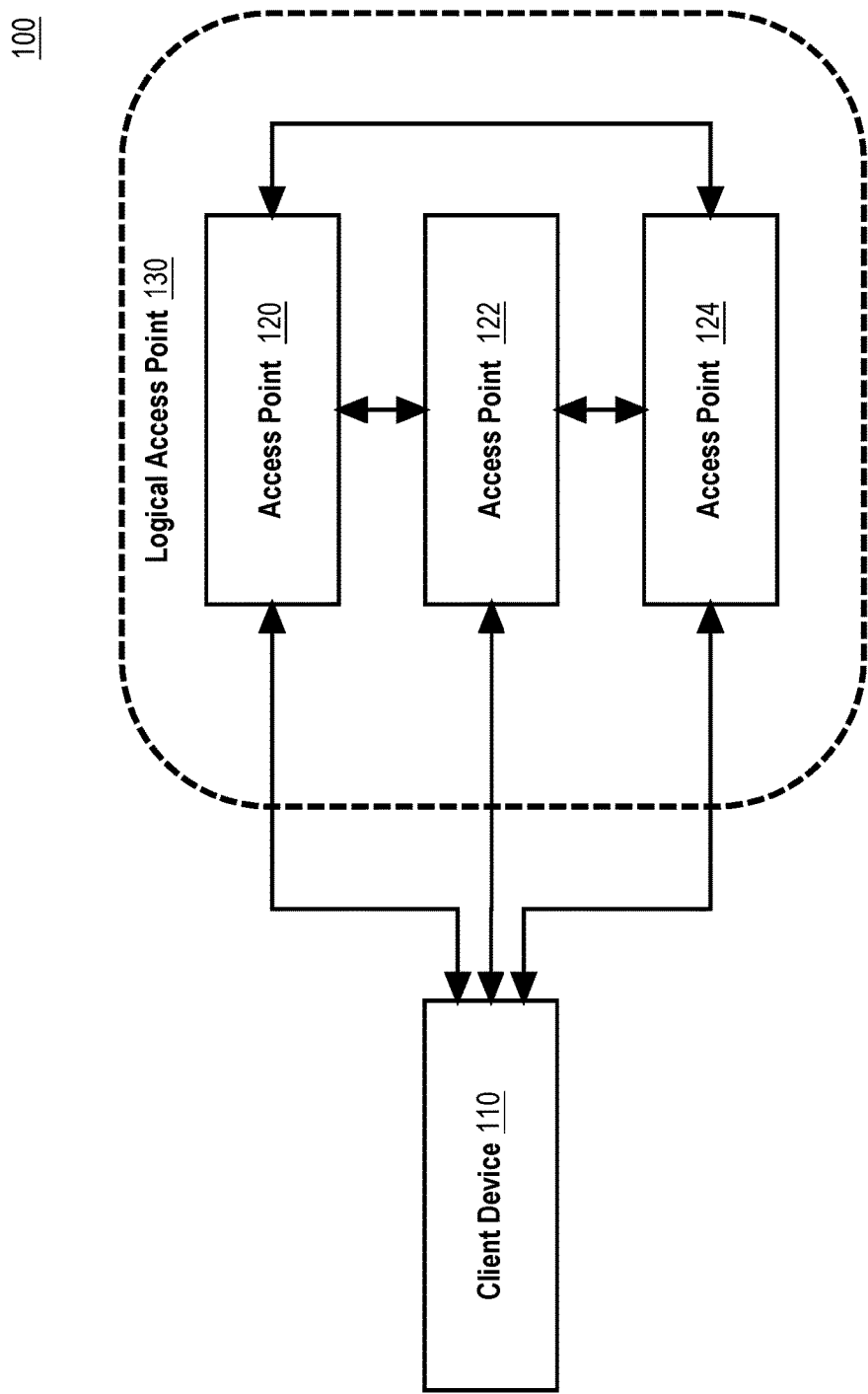
FIG. 1 is a block diagram of a wireless network system, according to one embodiment.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s). It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
  2.1 ACCESS POINTS
  2.2 CONNECTION CRITERIA
  2.3 CONNECTION SCORES
  2.4 HANDOFF BETWEEN ACCESS POINTS 3.0 EXAMPLE PROCESSES AND ALGORITHMS
4.0 IMPLEMENTATION MECHANISMS—HARDWARE OVERVIEW
5.0 IMPLEMENTATION MECHANISMS—SOFTWARE OVERVIEW
6.0 OTHER ASPECTS OF DISCLOSURE 1.0 GENERAL OVERVIEW

In an embodiment, a wireless network system is described. The wireless network system comprises a plurality of wireless access points and one or more client devices. The access points are programmed or configured such that a single access point is the primary access point for handling encrypted communication with a particular client device. The primary access point is programmed or configured to be responsible for communication with the particular client device.

In an embodiment, upon detecting a signal from a particular client device at one or more of the access points of the wireless network system, each of the access points is programmed or configured to calculate a connection score for communication with the client device and broadcast its connection score to the other access points in the network. The connection score of an access point is a value that represents the overall suitability of the access point for handling communication with the particular client device. The connection score may be calculated based on one or more connection criteria. The connection criteria may include any criteria related to the functioning or performance of the wireless access point, or communication between the access point and the particular client device. For example, connection criteria may include, but is not limited to, received signal strength indicator (RSSI) for communication between the client device and the access point, performance load of the access point, and/or latency of communication between the client device and the access point.

Once connection scores are broadcast to the access points, the access point with the highest connection score, the first access point, is designated as the primary access point for particular client device. In an embodiment, the first access point may be programmed or configured to send a broadcast message to the other access points indicating that it is the primary access point for the particular client device.

The primary access point for the particular client device is programmed or configured to perform a 4-way handshake with the client device to begin encrypted communication between the client device and the primary access point. Thus, the primary access point is able to generate a set of encryption keys for secure communication with the client device, including a Pairwise Transient Key (PTK). The PTK may be used for encrypted communication between the primary access point and the client device. In an embodiment, the PTK also includes an initialization vector (IV) which is a monotonically increasing counter for encrypted communication between the client device and the primary access point. The IV is incremented with every new packet transmitted by a communicating entity and can be used by the other end-point to detect message replay attacks.

The primary access point continually receives broadcast updates from the other access points in the wireless network that includes updated connection scores. The primary access point may store the connection scores for the other access points. If the primary access point determines that a second access point has a better connection score for communication with the client device than the primary access point itself, the primary access point can handoff communication responsibilities for the client device to the second access point by promoting the second access point to be the new primary access point for communication with the client device and demoting itself to be a normal access point. During this handoff process, the primary access point transmits the encryption key(s), including the IV, to the second access point, and likewise, the primary access point halts managing communication with the client device or incrementing the IV. The second access point, once it has been promoted to be the new primary access point, is programmed or configured to handle future encrypted communication with the client device. Since the PTK including the IV are seamlessly transmitted between the first access point and the second access point when the second access point is designated as the new primary access point, there is no need for the client device to conduct a 4-way handshake with the second access point, as the second access point already has access to the encryption key(s) generated by the first access point during the initial communication. Thus, the client device seamlessly roams to the second access point without even being aware of the roam. The handoff procedure is completely transparent to the client device.

Moreover, each of the access points in the wireless network advertises the same Basic Service Set Identifier (BSSID) to the client device. Thus, from the client device's perspective, the access points of the wireless network are a single logical access point, even though the single logical access point may include a plurality of physical access points. Thus, the transference of handling of communication from the first access point to the second access point is seamless from the perspective of the client device, as both the first access point and the second access point share the same BSSID and thus share the same MAC address.

The present techniques provide various improvements over existing computing networks and roaming schemes for wireless networks. First, the present techniques allow for seamless handoff between access points without repeating a 4-way handshake between the client device and the new access point. This improved communication minimizes unnecessary network communication and improves network performance.

Second, the present techniques do not require a separate controller to manage handoffs between access points, as all logic for handling handoffs between access points is managed by the access points themselves, thereby minimizing the computational and communication overhead of a controller-based architecture and also eliminating the need for an explicit device acting as a controller in the network.

Third, the present techniques do not require any software or hardware update on the client device, as, from the client device's perspective, the various access points all share a same BSSID and are a single logical access point. This means that a client device can connect to a wireless network using these techniques immediately without requiring any client-side updates or upgrades.

Fourth, under the present techniques, the access points are entirely in charge of which access point is handling communication with the client device as the primary access point. In prior approaches to access point handoffs, an access point would suggest to the client device that they handoff communication to another access point, but the client device was ultimately responsible for handing off communication to a new access point. The client device may then, unintentionally, affect performance of the wireless network as a whole by failing to comply with the suggestion of the access point. The present techniques avoid this problem, because the access points themselves are able to control which access point is used for handling communication with the client device, therefore, the client device is unable to override the access points.

Fifth, the present techniques allow for access points to attempt to predict favorable access point handoffs for the client device and initiating such handoffs proactively based on changes to connection criteria and/or connections scores. This proactive handoff implementation allows for improved communication experience for the client device, rather than a reactive handoff that is initiated by the client device.

Sixth, the present techniques allow for seamless handoffs in encrypted enterprise networks through the fast exchange of keys, as compared to previous approaches which were limited to using open unencrypted networks.

2.0 EXAMPLE COMPUTER SYSTEM IMPLEMENTATION

FIG. 1 illustrates an example wireless network system 100 in which the techniques described herein may be practiced, according to some embodiments. Wireless network system 100 is programmed or configured to provide seamless roaming of client devices between access points. Wireless network system 100 may be implemented across one or more physical or virtual computing devices, none of which is intended as a generic computer, since it is loaded with instructions in a new ordered combination as otherwise disclosed herein to implement the functions and algorithms of this disclosure. The example components of wireless network system 100 in FIG. 1 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. The functions described herein are intended to indicate operations that are performed using programming in a special-purpose computer or general-purpose computer, in various embodiments. Wireless network system 100 illustrates only one of many possible arrangements of components configured to execute the programming described herein. Other arrangements may include fewer or different components, and the division of work between the components may vary depending on the arrangement.

Wireless network system 100 is a network system, such as an enterprise wireless network, comprising a plurality of wireless access points 120, 122, and 124. Although depicted in FIG. 1 as containing three access points 120, 122, and 124, in other embodiments, a wireless network system 100 may include any plurality of two or more access points. An access point may be defined as any transmitter for a wireless signal, and may include a wireless router, cellular base station, antenna, or any other similar transmitter. An access point generates a wireless coverage area for a wireless network and may be communicatively coupled to one or more client devices 110 over a wireless connection. Each of the access points 120, 122, and/or 124 is communicatively coupled to each other, thus each of the access points 120, 122, and/or 124 is capable of broadcasting connection scores represents the overall suitability of the access point for handling communication with the client device 110 to the other access points in the network. Further details regarding this connection score will be discussed herein.

A client device 110 may be defined as any computing device that is communicatively coupled to a wireless network via wireless transmission. Examples of client devices include smartphones, tablet devices, desktop computers, laptop computers, printers, Internet-of-Things (IoT) devices, wearable devices, unmanned aerial vehicles (UAVs), robotic systems, or any other type of computing device that is capable of wireless transmission. Client devices may communicate with an access point in a wireless network via one or more wireless transmission protocols, such as 802.11 a/b/g/n, Bluetooth, Long-Term Evolution (LTE), 3G, Code-Division Multiple Access (CDMA), or any other wireless protocol.

2.1 Access Points

Wireless network system comprises a plurality of wireless access points 120, 122, and 124. Although depicted in FIG. 1 as containing three access points 120, 122, and 124, in other embodiments, a wireless network system 100 may include any plurality of two or more access points. An access point may be defined as any transmitter for a wireless signal, and may include a wireless router, cellular base station, antenna, or any other similar transmitter. An access point generates a wireless coverage area for a wireless network and may be communicatively coupled to one or more client devices 110 over a wireless connection.

Each of the access points 120, 122, and/or 124 advertises the same Basic Service Set Identifier (BSSID) to client device 110. Thus, from the perspective of client device 110, each of the access points 120, 122, and/or 124 have the same MAC address. Therefore, in an embodiment, all of the access points 120, 122, and/or 124 of a wireless network system 100 may be collectively referred to as a logical access point 130. A logical access point 130 is a plurality of access points that advertise the same BSSID. Thus, from the perspective of client device 110, communication with each of the access points 110, 122, and 124 appears as if it the client device 110 is communicating with a single logical access point 130, even though the logical access point 130 comprises a plurality of different physical access points 110, 122, and 124. Client device 110 communicates with the logical access point 130 without knowing which particular access point 120, 122, or 124 is serving as the primary access point of the network. This provides a seamless roaming functionality to client device 110, while allowing the access points 120, 122, and 124 to handle handoffs without requiring the client device 110 to perform a 4-way handshake.

In an embodiment, at least one of the access points 120, 122, and/or 124 may be designated as the primary access point for communication with client device 110. A primary access point is an access point that is programmed or configured to handle encrypted communication with the client device 110. A primary access point has access to the necessary encryption key(s) for encrypted communication with client device 110, including the PTK. Additionally, the primary access point may continue to increment the initialization vector (IV) during communication with the client device 110. The other access points in the wireless network system 100 that are not designated as the primary access point for communication with the client device 110 do not have permission to perform encrypted communication with the client device 110 and cannot increment the IV. In an embodiment, only a single access point of the access points 120, 122, and 124 may be designated as the primary access point for communication with client device 110. If a handoff is necessary from the primary access point to another access point, then, during the handoff process, the second access point will be designated as the new primary access point for communication with client device 110. The handoff process is programmed or configured to allow the old primary access point to share the encryption key(s) to the new primary access point, so that the new primary access point does not need to perform a 4-way handshake with the client device 110. Further details regarding the handoff process will be described herein.

In an embodiment, each of the access points 120, 122, and/or 124 may serve as a primary access point for a different client device. For example, assuming that there exist four different client devices C1, C2, C3, and C4 (not pictured in FIG. 1), then access point 120 may serve as the primary access point for client device C1, access point 122 may serves as the primary access point for client device C2, and access point 124 may serves as the primary access point for client devices C3 and C4. These primary access point responsibilities may be handed off as necessary between the various access points 120, 122, and 124 based on changes to connection scores, as will be described herein.

2.2 Connection Criteria

Each access point 120, 122, and/or 124 of wireless network system 100 is programmed or configured to track and/or store connection criteria. In an embodiment, each access point 120, 122, and/or 124 is programmed or configured to detect changes to connection criteria. Connection criteria is information that measures either the performance of the particular access point or connectivity between the particular access point and the client device 110.

For example, one example of connection criteria is a received signal strength indicator (RSSI) for communication between the particular client device and the particular access point. RSSI measures the strength of the signal between the particular client device and the particular access point. Thus, an access point with a higher RSSI has a stronger signal strength when communicating with the particular client device.

Another example of connection criteria is the performance load of the access point. Load of the access point is one or more measurements of the performance of the access point, and may include the CPU usage of the access point, memory usage of the access point, a count of the number of actively connected client devices, the rate of incoming data requests at the access point, the bandwidth of message communications being handled by the access point, or any other value that measures the amount of load the access point is experiencing.

Another example of connection criteria is the latency of communication between the particular client device and the access point. Latency is a measure of the amount of time it takes for a packet of data to be transmitted to and/or from the particular client device.

2.3 Connection Scores

An access point is programmed or configured to calculate one or more connection scores. A connection score of an access point is a value that represents the overall suitability of the access point for handling encrypted communication with the particular client computing device. Connection scores may be calculated applying a function to connection criteria. Thus, as changes to the connection criteria are detected, the associated connection scores for the access points will be re-calculated and updated. For example, if the access point detects a change to the latency between the access point and the client device, which is an example of connection criteria, the corresponding connection score for the access point's communication with the client device may be re-calculated and updated. The updated connection score may be broadcast to other access points in the network. A higher connection score indicates that a particular access point is better suited to handle encrypted communication with the client device 110 and should be designated as the primary access point for communication with the client device 110.

In an embodiment, each access point 120, 122, and/or 124 locally stores a copy of the latest connection scores for each client device connected to the wireless network. Each access point 120, 122, and/or 124 broadcasts its connection scores to each other access point in the wireless network for each client device 110 detected in the wireless network system 100. In an embodiment, each access point may broadcast connection score on a periodic basis. The periodic basis, in one embodiment, may be specified via a configurable setting.

In another embodiment, an access point may broadcast a connection score when that particular connection score changed by a significant margin, as defined by a pre-defined configurable setting. For example, a pre-defined configurable setting may indicate that an access point should rebroadcast a connection score if the connection score exceeds or falls below a set of threshold values. In another embodiment, a pre-defined configurable setting may indicate that an access point should rebroadcast a connection score whenever the connections score is updated.

In another embodiment, an access point may broadcast a connection score for a client device 110 when the primary access point for that client device 110 sends a request for an updated connection score.

In an embodiment, once an access point is designated as the primary access point for the client device 110, the primary access point is programmed or configured to store the latest connection scores for each access point's communication with the client device 110. The primary access point receives connection scores from the other access points via broadcasts and stores the latest connection scores locally. Additionally, the primary access point is able to continually calculate and update its own connection score for communication with the client device 110. When the connection score for a second access point exceeds the connection score for the primary access point by a configurable threshold, the primary access point may initiate a handoff to the second access point that will designate the second access point as the new primary access point. Thus, the primary access point serves as the gatekeeper in deciding when to handoff encrypted communication with the client device 110 to another access point or not, and a controller-based architecture is not necessary.

2.4 Handoff Between Access Points

The primary access point for a client device 110 is programmed or configured to handle encrypted communication with the client device 110. No other access points in the wireless network system 100 may perform encrypted communication with the client device 110. The primary access point has access to the necessary encryption key(s) for handling encrypted communication with the client device 110, including the PTK. The PTK may have been generated by the primary access point itself during a 4-way handshake with the client device 110 or may have been received from a separate access point that was previously the primary access point for communication with the client device 110. The primary access point is the only access point that is allowed to increment the IV for communication with the client device 110.

When the client device 110 roams the wireless network, it may be necessary to handoff the primary access point responsibilities from the current primary access point to a new primary access point. In an embodiment, the current primary access point is programmed or configured to compare the connection scores of other access points in the wireless network with its own connection score. If the connection score for a second access point ever exceeds the connection score of the current primary access point by a configurable threshold, the current primary access point is programmed or configured to handoff the client device 110 to the second access point and designate the second access point as the new primary access point for communication with client device 110. During the handoff process, the current primary access point will halt encrypted communication with the client device 110 and send one or more message(s) to the second access point to indicate that the second access point is now the primary access point, to transmit the encryption key(s), including the PTK and IV, and/or to demote itself so that it is no longer the primary access point for the client device 110.

The present techniques thus allow for seamless handoffs between access points when a client device 110 roams through the wireless network. Since the encryption key(s) are sent directly from the old primary access point to the new primary access point, a new 4-way handshake between the client device 110 and the new primary access point is not necessary. Instead, the existing encryption key(s) may continue to be used. Further details regarding the handoff will be described herein with regard to FIG. 3.

3.0 EXAMPLE PROCESSES AND ALGORITHMS

Figure 2:
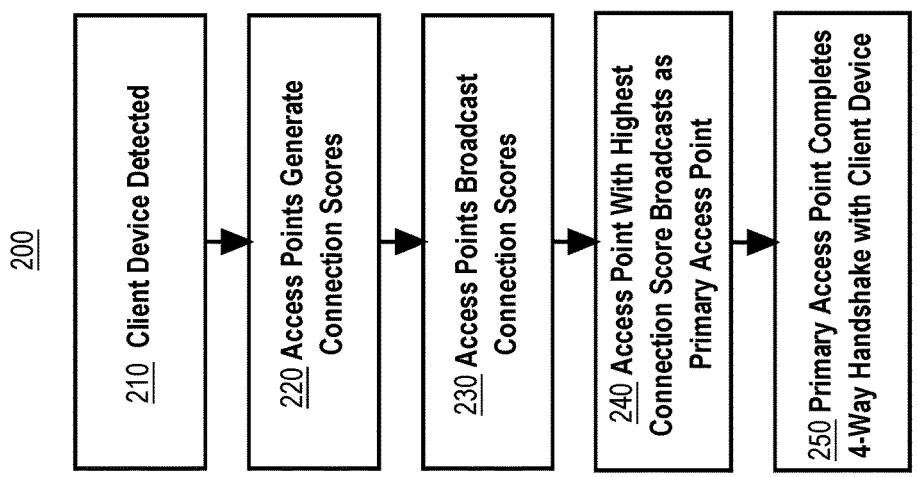
FIG. 2 illustrates a process for connecting a client device to a wireless network system, according to one embodiment.

FIG. 2 illustrates a flow diagram of an example process 200 for connecting a client device 110 to a wireless network system 100, according to one embodiment. FIG. 2 is intended to disclose an algorithm or functional description that may be used as a basis of writing computer programs to implement the functions that are described herein, and which cause a computer to operate in the new manner that is disclosed herein. Further, FIG. 2 is provided to communicate such an algorithm at the same level of detail that is normally used, by persons of skill in the art to which this disclosure is directed, to communicate among themselves about plans, designs, specifications and algorithms for other computer programs of a similar level of complexity. The steps of process 200 may be performed in any order, and are not limited to the order shown in FIG. 2.

Process 200 may begin with step 210. In step 210, one or more access points 120, 122, and/or 124 are programmed or configured to detect client device 110 in range of one or more of the access points. In an embodiment, client device 110 may be in range of a single access point, and in another embodiment, client device 110 may be in range of multiple access points of wireless network system 100. In an embodiment, client device 110 is detected to be in range of the one or more access points when a RSSI for the client device 110 exceeds a pre-specified threshold. In an embodiment, each access point 120, 122, and/or 124 advertises the same BSSID to the client device 110, thus, from the perspective of the client device 110, there is only a single logical access point 130 in range. Once the client device 110 is detected, the process may then proceed to step 220.

In step 220, each access point 120, 122, and/or 124 in wireless network system 100 that is in range of client device 110 is programmed or configured to generate a connection score for communication with client device 110. The connection score may be calculated using one or more functions applied to the connection criteria. Connection criteria may be status information that either describes the performance or status of the access point or status information that describes the connectivity of the client device 110 to the particular access point. Examples of connection criteria include the load of the particular access point, the latency in communication between the client device 110 and the particular access point, and/or the RSSI of the client device 110 at the particular access point. In an embodiment, the connection criteria may be determined by the access point itself. The connection criteria then may be used by the access point to generate, calculate, and/or determine a connection score that represents the suitability of communication between the access point and the client device 110. Once the connection score(s) have been generated, the process 200 may then proceed to step 230.

In step 230, each access point 120, 122, and/or 124 that generated a connection score in step 220 is programmed or configured to broadcast its connection score to each other access point in the wireless network. Thus, each access point 120, 122, and/or 124 has access to the connection scores for all access points' suitability for handling communication with the client device 110. The process 200 may then proceed to step 240.

In step 240, the access points 120, 122, and/or 124 use the connection scores generated in step 230 to determine which access point has the highest connection score. In an embodiment, if no connection score is received for a particular access point, the connection score for that access point is assumed to be zero by default. The access point with the highest connection score is designated as the primary access point for communication with the client device 110 and is programmed or configured to handle encrypted communication with the client device 110. The primary access point thus broadcasts to the remaining access points of the wireless network system 100 that it is the primary access point for the client device 110. For example, if access point 120 has a connection score of 80 and access points 122 and 124 have connection scores of 50, then access point 120 would be designated as the primary access point for client device 110. Access point 120 would thus broadcast to access points 122 and 124 that it is the primary access point for handling encrypted communication with client device 110. By broadcasting this information, the other access point 122 and 124 will defer direct communication to the client device 110 to be handled by the primary access point. The process 200 may then proceed to step 250.

In step 250, the primary access point designated in step 240 begins and completes a 4-way handshake with client device 110 to begin encrypted communication. For example, a 4-way handshake protocol, such as the one used in the WPA-2 protocol, may be used. The result of the 4-way handshake is that the client device 110 and the primary access point will each generate encryption key(s), such as a PTK, to be used for encrypted communication with one another. The PTK includes an IV, which is a monotonically increasing counter for encrypted data packets communicated between the primary access point and the client device 110. The primary access point is the only access point in wireless network system 100 with permission to increment the IV and with permission to communicate via encrypted communication with client device 110, until a new primary access point is designated. Process 200 thus allows for a client device 110 to begin an authenticated communication channel with a wireless access point in wireless network system with the best connection score.

Figure 3:
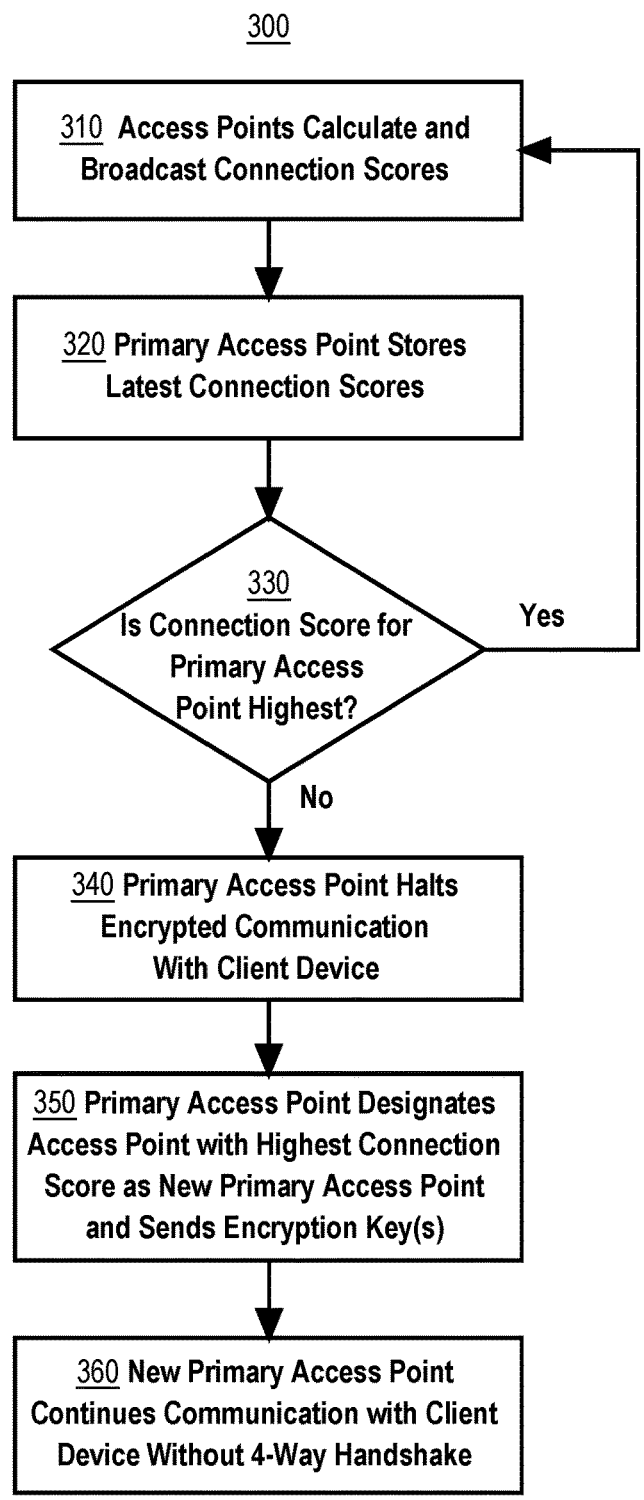
FIG. 3 illustrates a process for performing a handoff of a client device between access points, according to one embodiment.

FIG. 3 illustrates a flow diagram of an example process 300 for performing a handoff between two access points in a wireless network system 100, according to one embodiment. FIG. 3 is intended to disclose an algorithm or functional description that may be used as a basis of writing computer programs to implement the functions that are described herein, and which cause a computer to operate in the new manner that is disclosed herein. Further, FIG. 3 is provided to communicate such an algorithm at the same level of detail that is normally used, by persons of skill in the art to which this disclosure is directed, to communicate among themselves about plans, designs, specifications and algorithms for other computer programs of a similar level of complexity. The steps of process 300 may be performed in any order, and are not limited to the order shown in FIG. 3.

The process 300 describes a handoff between two access points in a wireless network system 100, according to one embodiment. In the example of process 300, one access point is already assumed to be designated as the primary access point for communication with client device 110 and a 4-way handshake has already occurred for encrypted communication between the client device 110 and the primary access point. Thus, the primary access point has access to encryption key(s) for encrypted communication, including the PTK. Additionally, the primary access point is programmed or configured to increment the IV during communication with the client device 110. For example, the previously described process 200 of FIG. 2 may have been used to perform an initial 4-way handshake between client device 110 and the primary access point to generate the encryption key(s).

The process 300 may begin at step 310. In step 310, each access point 120, 122, and/or 124 calculates and broadcasts connection scores to each other access point in the wireless network system 100. The connection scores are values that represent the suitability of the particular access point to handle encrypted communication with client device 110 and may be calculated by each access point using one or more functions applied to connection criteria detected at the access point. Examples of connection criteria include the load of the particular access point, the latency in communication between the client device 110 and the particular access point, and/or the RSSI of the client device 110 at the particular access point. Once the connection scores have been broadcast to the access points, the process 300 may then proceed to step 320. In various embodiments, an access point may broadcast its connection score for the particular client device on a periodic basis, whenever the connection score has been updated, or when requested by the primary access point, among other techniques as described earlier.

In step 320, the primary access point that is responsible for handling encrypted communication with the client device 110 is programmed or configured store the latest connection score for each access point in the wireless network, including itself. Each connection score is associated with a particular access point in the wireless network system 100 and represents the performance, connectivity, and/or availability of the particular access point for handling communication with client device 110. Once the primary access point has stored the latest connection scores, the process 300 may proceed to step 330.

In step 330, the primary access point is programmed or configured to compare the connection score for the primary access point to each of the other connection scores for the other access points in the wireless network system 100. If the connection score for the primary access point is the highest connection score, then the primary access point is determined to be the best access point for handling continued encrypted communication with the client device 110 and the process 300 may proceed to step 310 to await further broadcast(s) of connection criteria. If the connection score for the primary access point is not the highest connection score, then the primary access point is no longer the best access point for handling continued encrypted communication with the client device 110 and the process 300 may proceed to step 340.

In step 340, the primary access point is programmed or configured to halt encrypted communication with the client device 110 in order to prepare for handoff to another access point. Encrypted communication is halted in order to ensure that the primary access point does not continue to increment the IV associated with the PTK by continuing to send and receive encrypted data packets. The process 300 may then proceed to step 350.

In step 350, the primary access point is programmed or configured to designate the access point with the highest connection score, as determined in step 330, as the new primary access point for handling encrypted communication with client device 110. The primary access point sends a message to the newly designated primary access point that indicates that the newly designated primary access point is now the primary access point for handling encrypted communication with client device 110. The primary access point additionally sends the encryption keys, including the PTK and IV, to the newly designated primary access point. The primary access point additionally demotes itself to be a normal access point, so that there is only a single primary access point for the client device 110: the newly designated primary access point. The process 300 may then proceed to step 360.

In step 360, the newly designated primary access point from step 350 is programmed or configured to continue handling encrypted communication with the client device 110. The newly designated primary access point has access to the encryption key(s) necessary for encrypted communication, as received in step 350. Thus, the newly designated primary access point can continue encrypted communication with client device 110 without having to perform a new 4-way handshake with the client device 110. Additionally, the newly designated primary access point is programmed or configured to be able to begin incrementing the IV, which was previously halted in step 340. From the perspective of the client device 110, handoff of communication from the old primary access point to the newly designated primary access point is seamless, because the encryption key(s) were shared from the old primary access point to the newly designated primary access point without requiring a 4-way handshake and because both access point(s) share the same BSSID, therefore, no changes were necessary on the client device 110. The process 300 may then end.

4.0 IMPLEMENTATION MECHANISMS—HARDWARE OVERVIEW

Figure 4:
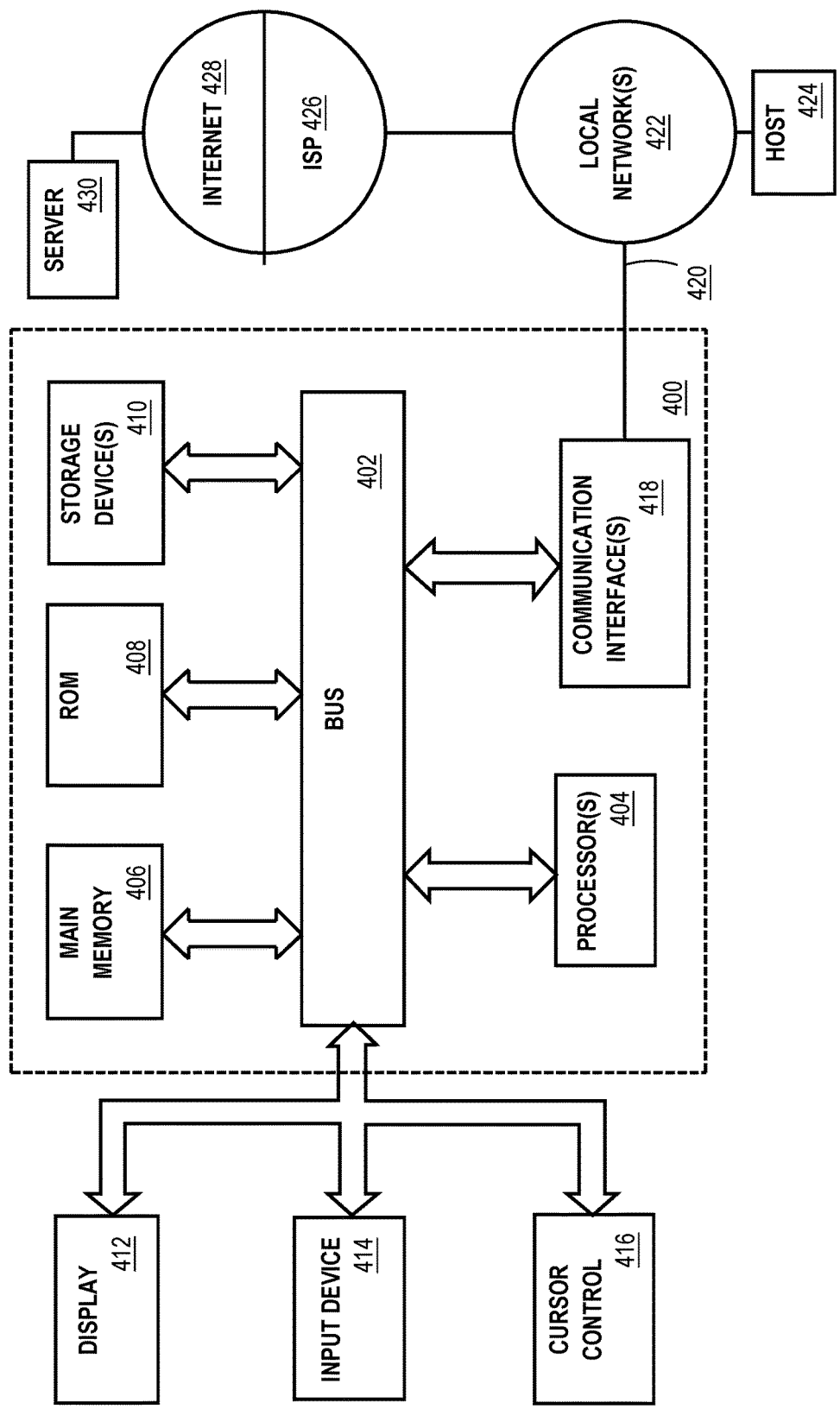
FIG. 4 is a block diagram of a computing device in which the example embodiment(s) may be embodied.

Referring now to FIG. 4, it is a block diagram that illustrates a computing device 400 in which the example embodiment(s) may be embodied. Computing device 400 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 400 may include a bus 402 or other communication mechanism for addressing main memory 406 and for transferring data between and among the various components of device 400.

Computing device 400 may also include one or more hardware processors 404 coupled with bus 402 for processing information. A hardware processor 404 may be a general purpose microprocessor, a system on a chip (SoC), or other processor.

Main memory 406, such as a random access memory (RAM) or other dynamic storage device, also may be coupled to bus 402 for storing information and software instructions to be executed by processor(s) 404. Main memory 406 also may be used for storing temporary variables or other intermediate information during execution of software instructions to be executed by processor(s) 404.

Software instructions, when stored in storage media accessible to processor(s) 404, render computing device 400 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 400 also may include read only memory (ROM) 408 or other static storage device coupled to bus 402 for storing static information and software instructions for processor(s) 404.

One or more mass storage devices 410 may be coupled to bus 402 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 410 (e.g., the main hard disk for the device) stores a body of program and data for directing operation of the computing device, including an operating system, user application programs, driver and other support files, as well as other data files of all sorts.

Computing device 400 may be coupled via bus 402 to display 412, such as a liquid crystal display (LCD) or other electronic visual display, for displaying information to a computer user. In some configurations, a touch sensitive surface incorporating touch detection technology (e.g., resistive, capacitive, etc.) may be overlaid on display 412 to form a touch sensitive display for communicating touch gesture (e.g., finger or stylus) input to processor(s) 404.

An input device 414, including alphanumeric and other keys, may be coupled to bus 402 for communicating information and command selections to processor 404. In addition to or instead of alphanumeric and other keys, input device 414 may include one or more physical buttons or switches such as, for example, a power (on/off) button, a "home" button, volume control buttons, or the like.

Another type of user input device may be a cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

While in some configurations, such as the configuration depicted in FIG. 4, one or more of display 412, input device 414, and cursor control 416 are external components (i.e., peripheral devices) of computing device 400, some or all of display 412, input device 414, and cursor control 416 are integrated as part of the form factor of computing device 400 in other configurations.

Functions of the disclosed systems, methods, and modules may be performed by computing device 400 in response to processor(s) 404 executing one or more programs of software instructions contained in main memory 406. Such software instructions may be read into main memory 406 from another storage medium, such as storage device(s) 410. Execution of the software instructions contained in main memory 406 cause processor(s) 404 to perform the functions of the example embodiment(s).

While functions and operations of the example embodiment(s) may be implemented entirely with software instructions, hard-wired or programmable circuitry of computing device 400 (e.g., an Application-Specific Integrated Circuit or "ASIC", a Field-Programmable Gate Array or "FPGA", or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a Random-Access Memory (RAM), a Programmable Read-Only Memory (PROM), an Erasable Programmable Read-Only Memory (EPROM), a FLASH-Erasable Programmable Read-Only Memory (FLASH-EPROM), a Non-Volatile Random-Access Memory (NVRAM), flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more software instructions to processor(s) 404 for execution. For example, the software instructions may initially be carried on a magnetic disk or solid-state drive of a remote computer. The remote computer can load the software instructions into its dynamic memory and send the software instructions over a telephone line using a modem. A modem local to computing device 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor(s) 404 retrieves and executes the software instructions. The software instructions received by main memory 406 may optionally be stored on storage device(s) 410 either before or after execution by processor(s) 404.

Computing device 400 also may include one or more communication interface(s) 418 coupled to bus 402. A communication interface 418 provides a two-way data communication coupling to a wired or wireless network link 420 that is connected to a local network 422 (e.g., Ethernet network, Wireless Local Area Network, cellular phone network, Bluetooth wireless network, or the like). Communication interface 418 sends and receives electrical, electromagnetic, or optical signals that carry digital data streams representing various types of information. For example, communication interface 418 may be a wired network interface card, a wireless network interface card with an integrated radio antenna, or a modem (e.g., Integrated Services Digital Network or "ISDN", Digital Subscriber Line or "DSL", or cable modem).

Network link(s) 420 typically provide data communication through one or more networks to other data devices. For example, a network link 420 may provide a connection through a local network 422 to a host computer 424 or to data equipment operated by an Internet Service Provider (ISP) 426. ISP 426 in turn provides data communication services through the world wide packet data communication network now commonly referred to as the "Internet" 428. Local network(s) 422 and Internet 428 use electrical, electromagnetic or optical signals that carry digital data streams. The signals through the various networks and the signals on network link(s) 420 and through communication interface(s) 418, which carry the digital data to and from computing device 400, are example forms of transmission media.

Computing device 400 can send messages and receive data, including program code, through the network(s), network link(s) 420 and communication interface(s) 418. In the Internet example, a server 430 might transmit a requested code for an application program through Internet 428, ISP 426, local network(s) 422 and communication interface(s) 418.

The received code may be executed by processor 404 as it is received, and/or stored in storage device 410, or other non-volatile storage for later execution.

5.0 IMPLEMENTATION MECHANISMS—SOFTWARE OVERVIEW

Figure 5:
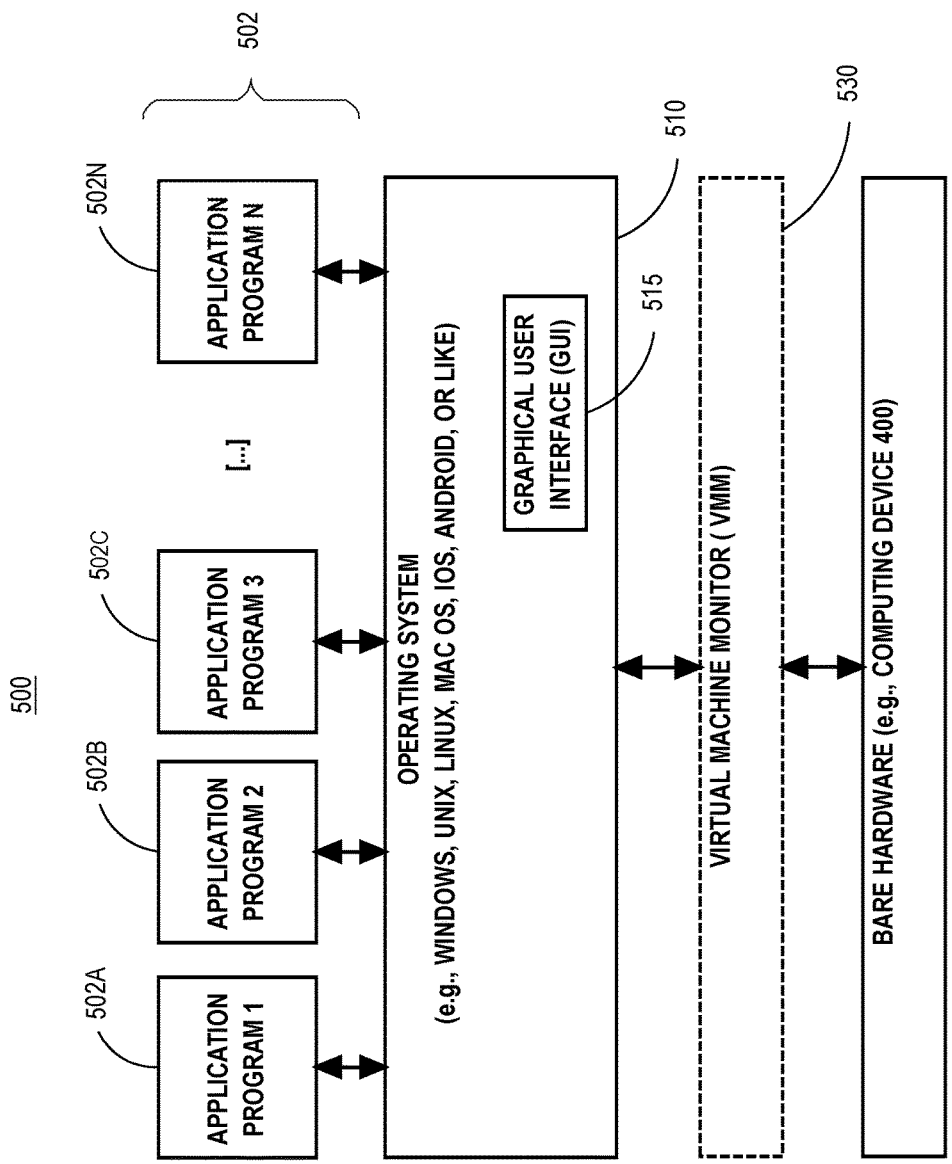
FIG. 5 is a block diagram of a software system for controlling the operation of the computing device.

FIG. 5 is a block diagram of a software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on software system 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 OTHER ASPECTS OF DISCLOSURE

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
storing, at a first access point of a plurality of access points, an encryption key for encrypted communication with a client device;
using the encryption key to perform encrypted communication between the first access point and the client device;
generating, at each particular access point of the plurality of access points, a particular connection score of a plurality of connection scores wherein each particular connection score is generated by the particular access point based on connection criteria and wherein the connection criteria is data that describes performance of the particular access point or communication between the particular access point and the client device;
receiving, at the first access point, the plurality of connection scores from the plurality of access points,
determining, at the first access point, that a connection score associated with a second access point of the plurality of access points exceeds the connection score associated with the first access point; and
in response to determining that the connection score associated with the second access point of the plurality of access points exceeds the connection score associated with the first access point:
halting encrypted communication between the first access point and the client device;
sending the encryption key from the first access point to the second access point; and
using the encryption key to perform encrypted communication between the second access point and the client device, wherein the method is performed using one or more processors.

2. The method of claim 1, wherein the connection criteria comprises data that measures a performance load of the access point.

3. The method of claim 1, wherein the connection criteria comprises data that measures latency of communication between the client device and the access point.

4. The method of claim 1, wherein the connection criteria comprises data that measures a received signal strength indicator (RSSI) of a signal between the client device and the access point.

5. The method of claim 1, further comprising:
performing a 4-way handshake between the first access point and the client device to generate the encryption key.

6. The method of claim 1, wherein the encryption key comprises a Pairwise Transient Key (PTK).

7. The method of claim 6, wherein the PTK comprises an initialization vector (IV), wherein the IV is a monotonically increasing counter for data packet communication.

8. The method of claim 7, wherein halting encrypted communication between the first access point and the client device comprises halting incrementation of the IV.

9. The method of claim 1, wherein using the encryption key to perform encrypted communication between the second access point and the client device comprising performing encrypted communication between the second access point and the client device without performing a 4-way handshake between the second access point and the client device.

10. The method of claim 1, further comprising:
broadcasting, by each access point of the plurality of access points, a Basic Service Set Identifier (BSSID), wherein the BSSID is the same for each access point of the plurality of access points.

11. One or more non-transitory computer-readable media storing instructions, wherein the instructions include instructions which, when executed by one or more processors, cause:
storing, at a first access point of a plurality of access points, an encryption key for encrypted communication with a client device;
using the encryption key to perform encrypted communication between the first access point and the client device;
generating, at each particular access point of the plurality of access points, a particular connection score of a plurality of connection scores wherein each particular connection score is generated by the particular access point based on connection criteria and wherein the connection criteria is data that describes performance of the particular access point or communication between the particular access point and the client device;
receiving, at the first access point, the plurality of connection scores from the plurality of access points,
determining, at the first access point, that a connection score associated with a second access point of the plurality of access points exceeds the connection score associated with the first access point; and
in response to determining that the connection score associated with the second access point of the plurality of access points exceeds the connection score associated with the first access point:
halting encrypted communication between the first access point and the client device;
sending the encryption key from the first access point to the second access point; and
using the encryption key to perform encrypted communication between the second access point and the client device.

12. The one or more non-transitory computer-readable media of claim 11, wherein the connection criteria comprises data that measures a performance load of the access point.

13. The one or more non-transitory computer-readable media of claim 11, wherein the connection criteria comprises data that measures latency of communication between the client device and the access point.

14. The one or more non-transitory computer-readable media of claim 11, wherein the connection criteria comprises data that measures a received signal strength indicator (RSSI) of a signal between the client device and the access point.

15. The one or more non-transitory computer-readable media of claim 11, further comprising instructions which, when executed by one or more processors, cause:
performing a 4-way handshake between the first access point and the client device to generate the encryption key.

16. The one or more non-transitory computer-readable media of claim 11, wherein the encryption key comprises a Pairwise Transient Key (PTK).

17. The one or more non-transitory computer-readable media of claim 16, wherein the PTK comprises an initialization vector (IV), wherein the IV is a monotonically increasing counter for data packet communication.

18. The one or more non-transitory computer-readable media of claim 17, wherein halting encrypted communication between the first access point and the client device comprises halting incrementation of the IV.

19. The one or more non-transitory computer-readable media of claim 11, wherein using the encryption key to perform encrypted communication between the second access point and the client device comprising performing encrypted communication between the second access point and the client device without performing a 4-way handshake between the second access point and the client device.

20. The one or more non-transitory computer-readable media of claim 11, further comprising instructions which, when executed by one or more processors, cause:
broadcasting, by each access point of the plurality of access points, a Basic Service Set Identifier (BSSID), wherein the BSSID is the same for each access point of the plurality of access points.

\* \* \* \* \*